United States Patent [19]
Doshi et al.

[11] Patent Number: 5,130,986
[45] Date of Patent: Jul. 14, 1992

[54] HIGH SPEED TRANSPORT PROTOCOL WITH TWO WINDOWS

[75] Inventors: Bharat T. Doshi, Holmdel; Pravin K. Johri, Aberdeen; Arun N. Netravali, Westfield; Krishan K. Sabnani, Berkeley Heights, all of N.J.

[73] Assignee: AT&T Bell Laboratories, Murray Hill, N.J.

[21] Appl. No.: 515,386

[22] Filed: Apr. 27, 1990

[51] Int. Cl.⁵ .................................................. H04J 3/24
[52] U.S. Cl. ...................................... 370/94.1; 370/60
[58] Field of Search ............................... 370/94.1, 60

[56] References Cited

U.S. PATENT DOCUMENTS

| | | | |
|---|---|---|---|
| 4,839,891 | 6/1989 | Kobayashi et al. | 370/94.1 |
| 4,864,495 | 9/1989 | Inaba | 370/94.1 |
| 4,920,484 | 4/1990 | Ranade | 370/60 |
| 4,965,793 | 10/1990 | Polzin et al. | 370/94.1 |

OTHER PUBLICATIONS

Proceedings of Globecom 84, Nov. 1984, "Starlite: a Wideband Digital Switch", A. Huang et al., pp. 121-125.

*Primary Examiner*—Douglas W. Olms
*Assistant Examiner*—Dang Ton
*Attorney, Agent, or Firm*—R. J. Roddy

[57] ABSTRACT

A packet transmission protocol, which operates in a full-duplex mode in a system, which includes a transmitter, a receiver, and a communications network having a channel that logically ties the transmitter and the receiver together through the network, is disclosed. The receiver regularly sends a control packet to the transmitter. The control packet includes a plurality of data fields, which are useful in describing the state of the receiver to the transmitter. The transmitter receives the receiver's control packet and analyzes the data. If it finds that a particular block of packets had been received with an error (or not received at all), then the transmitter retransmits the block. The protocol includes two windows for controlling the volume of information, e.g. number of blocks, in the network. The first window, called the network window, is used to limit the data in the network so that network buffer resources can be sized economically and yet in a manner such that there will not be an excessive loss in the number of packets transmitted through the network. The second window, called the receiver flow control window, is typically larger than the first window and is used to assure that packets are not dropped, or lost, at the receiver. By having the second window larger than the first window, throughput can be increased while still meeting a commitment to the network that limits the number of packets in the network to a value consistent with economical buffer sizing. Typically, the first window is set to the value of the bandwidth delay product of the channel and the second window is set to a value at least twice that of the first window. The functions related to receiver flow control and network congestion control can be decoupled.

7 Claims, 2 Drawing Sheets

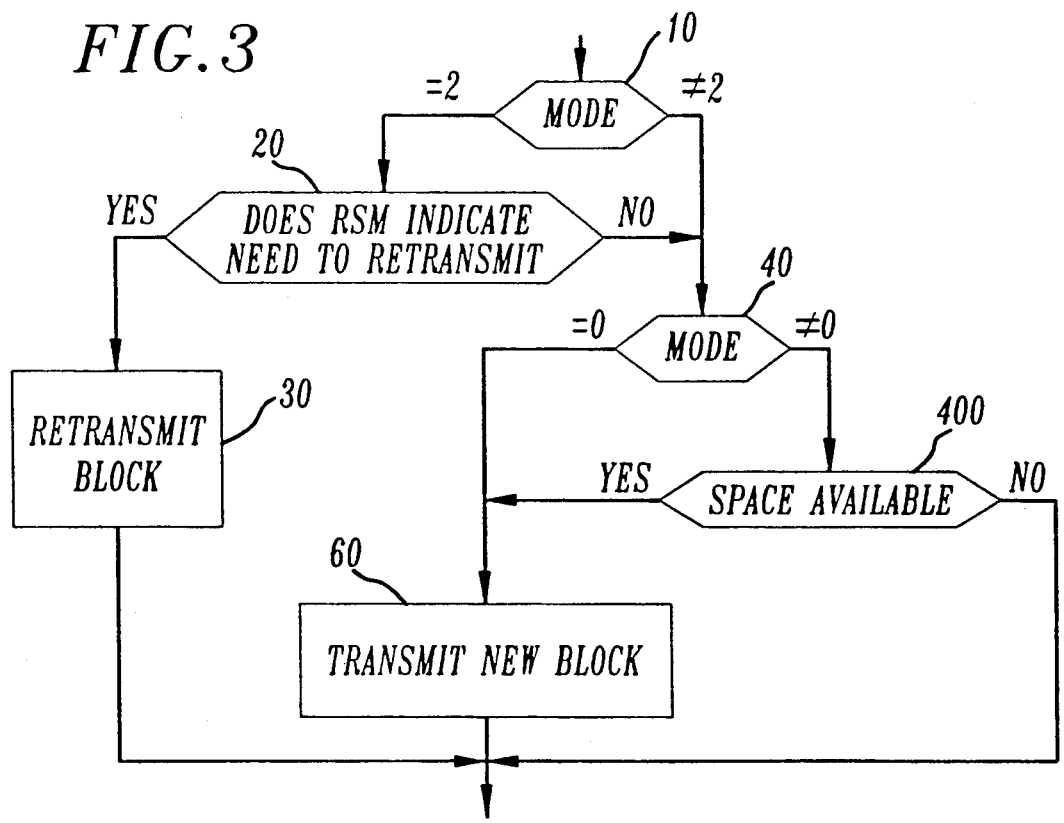

HIGH SPEED TRANSPORT PROTOCOL WITH TWO WINDOWS

BACKGROUND OF THE INVENTION

Field of the Invention

This invention relates to transmission protocols and, more particularly, to transmission protocols in a packet transmission communications system.

DESCRIPTION OF THE PRIOR ART

Advances in data transmission and switching over the last decade are promising deployment of communication systems with bandwidth and switching speeds that are an order of magnitude higher than current systems. Optical fibers, for example, allow transmission of tens of gigabits per second over several kilometers without repeaters. Switch fabrics that can switch bit-streams of a few hundreds of megabits per second have already been prototyped. However, the fruits of these efforts have not yet been realized in the delivery of high end-to-end bandwidth to applications within an operating system. Ideally, any single user connected to a packet network should be able to transmit at the peak bandwidth of the channel once access is obtained. In practice, however, the obtainable end-to-end throughput is only a small fraction of the transmission bandwidth, particularly at high speeds. This throughput limitation comes from a variety of factors, including protocol processing in the network's layers, buffer congestion, and flow control mechanisms.

In addition to bandwidth, consideration must also be given to signal propagation delays, or latency, in a network. For example, it takes about 60 milliseconds for a signal to be propagated from a transmitter in New York to a receiver in California and then for a signal to be propagated from the receiver in California to the transmitter in New York. This round trip propagation delay is also called a round trip delay (RTD) in the art.

Transmission protocols usually call for the receiver to acknowledge to the transmitter via some mechanism the fact of the receipt of correctly transmitted data, i.e., the receiver "tells" the transmitter that data was received at the receiver without transmission error.

Due to round trip delay, the transmitter and the receiver are typically not in synchronization with each other and there will be unacknowledged data in the network "pipeline". Indeed, if the transmitter has unlimited data to send and is allowed to send it unimpeded, the amount of unacknowledged data equals the product of the round trip delay and the bandwidth of the network interconnecting the transmitter and the receiver. This product is called the bandwidth delay product. For example, with a round trip delay of 60 milliseconds and a network channel running at 150 megabits per second, it turns out that the network can have 9 million bits of unacknowledged information. Thus, the bandwidth delay product here is 9 million bits.

Usually, the receiver stores data in a receiver buffer before passing the data onto the ultimate destination, sometimes called a host. A packet of data can be passed to the host only if the packet and all preceding packets have been received correctly by the receiver. Packets for which this condition is not satisfied are held in the receiver buffer until this condition is satisfied. Of the packets transmitted by the transmitter, some could still be in transit in the network while some could have reached the receiver but have to be held in the receiver buffer until this condition is met. Both of these types of packets are typically referred to as outstanding packets in the system.

In general, constraints are placed on the transmitter in terms of a limit on the amount of information that it is allowed to keep unacknowledged in the "pipeline" as well as the number of outstanding packets in the system. In order to allow unimpeded transmission in the absence of errors or losses, this limit, which is called the "window", is about equal to the bandwidth delay product. The actual value of the window is "negotiated" among the transmitter, receiver and the network at the connection establishment phase.

Patent application of A. N. Netravali and K. Sabnani, entitled "A High Speed Transport Protocol," Ser. No. 07/348449, filed May 5, 1989 discloses a protocol which uses a single window for a system in which there is a transmitter that transmits packets to a designated receiver, a receiver that receives the packets destined to it, and a communications network having a channel for coupling, or logically tying together, the transmitter and the designated receiver. The transmitter sends data packets to the receiver in blocks, or groups, of packets. The receiver regularly sends a control, or a state, packet to the transmitter that includes a plurality of data fields, which are useful in describing the state of the receiver to the transmitter. The transmitter receives the receiver's control packet and analyzes the data. If it finds that a particular block had been received with an error (or not received at all), and if a certain wait indicator is set to permit a retransmission of the block in error, then the transmitter retransmits the block. At that point the wait indicator is reset to prevent further retransmissions of the block just retransmitted.

Unfortunately, that protocol with a single window could lead to problems. For example, under error conditions, there can be a significant loss of throughput or network buffer resources may have to be sized much larger than necessary.

SUMMARY OF THE INVENTION

These and other problems are solved in accordance with the principles of our invention, which includes a method for communicating packets of information from a transmitter to a receiver. The method includes the transmitter sending packets of data to the receiver in blocks of a preselected number of packets. The receiver regularly sends a receiver control packet to the transmitter. The receiver control packet includes information for describing the state of the receiver to the transmitter. The transmitter regularly sends a transmitter control packet to the receiver. The transmitter control packet includes information for describing the state of the transmitter to the receiver. The transmitter sends packets of data as long as, after sending new data, the number of unacknowledged blocks in the network does not exceed a first window and as long as the number of outstanding blocks in the system does not exceed a second window where the first window and the second window are independently determined. The method expects the transmitter to terminate the sending of packets of data when the number of unacknowledged blocks in the network exceeds the first window or when the number of outstanding blocks in the system exceeds the second window. The first window, called the network window, is used to limit the data in the network so that network buffer resources can be sized economically and yet in a manner such that there will not be an excessive loss in the number of packets transmitted through the network. The second window, called the receiver flow control window, is typically larger than the first window and is used to assure that packets are not dropped, or lost, at the receiver. By having the second window larger than the first window, throughput can be increased while still meeting a commitment to the network that limits the number of packets in the network to a value consistent with economical buffer sizing.

BRIEF DESCRIPTION OF THE DRAWINGS

Our invention should become more apparent from the following detailed description when taken in conjunction with the accompanying drawing in which:

FIG. 1 illustrates a receiver control packet, which is sent from a receiver to a transmitter;

FIG. 2 illustrates a transmitter control packet, which is sent from a transmitter to a receiver;

FIG. 3 illustrates a flow chart for a transmitter process that can be used to determine a need for transmission or retransmission.

DETAILED DESCRIPTION

Figure 4:
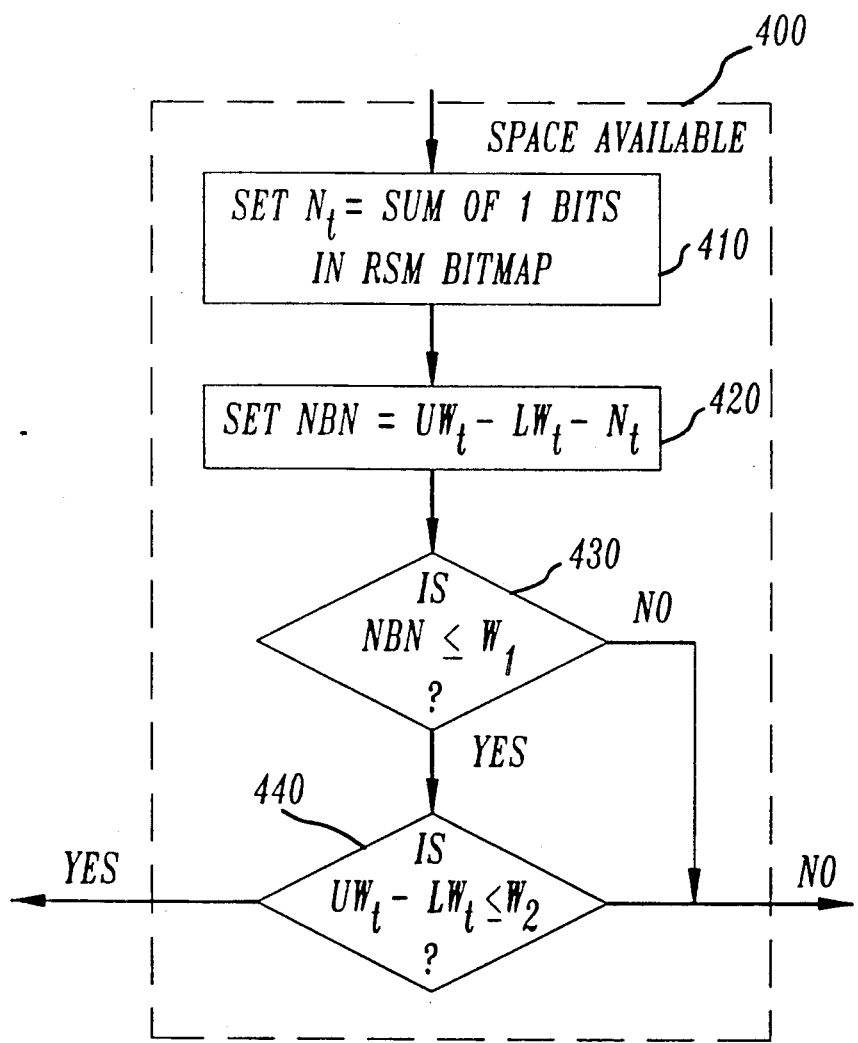
FIG. 4 illustrates a flow chart of a space available verification methodology such as may be used in the process illustrated in FIG. 3.

We begin a description of an illustrative embodiment of the principles of our invention by assuming a prior art structure, which includes a transmitter that transmits blocks of packets to a receiver, which receives blocks of packets that are destined for it. The transmitter and the destined receiver are coupled, or logically connected or logically tied, together by a network having a communications channel. We assume that the communications channel operates in a full-duplex mode, meaning that, concurrent with signals being sent from the transmitter to the receiver, other signals may be simultaneously sent from the receiver to the transmitter.

FIG. 1 depicts an illustrative receiver control packet that flows from a receiver to a transmitter. In a sense, a receiver control packet is the primary control packet because it serves to provide, among other things, an acknowledgment signal for advising the transmitter as to whether or not the receiver has correctly received a block of packets from the transmitter.

The first field of the control packet in FIG. 1 recites a Logical Connection Identifier (LCI) that logically ties a specific transmitter to a specific receiver. A unique LCI identifier is assigned to the logical connection, or logical coupling or logical tying, of the transmitter and the receiver typically during a connection establishment phase.

The second field in FIG. 1 recites k, which signals the time interval between two receiver control packet transmissions, expressed in units of $T_{IN}$ where $T_{IN}$ is the minimum time between the transmission of the two consecutive control packets and where $T_{IN}$ is a predefined parameter.

The third field $LW_r$ in FIG. 1 needs some background.

For each logical connection between a transmitter and a receiver, there is a buffer at the receiver. Operationally, the transmitter sends blocks of packets to the receiver. The receiver would check the packets for errors. If the receiver detects an error in a packet, the receiver would "drop" or discard the packet in the sense that the packet being in error would mean that the block to which the "errored" packet belongs is not correctly received at the receiver. Blocks, with and without errors, are stored in the receiver buffer; however, blocks with errors are marked differently than blocks without errors. On the one hand, when the receiver detects that all packets in a block are received without error, the block is marked as having been correctly received and a corresponding entry in a soon to be described bit map, also called a receiver status map (RSM), is set to a logical one. If a block and all lower sequence numbered blocks (sequence numbers will also be described shortly) are correctly received, the block may be routed to its destination, sometimes called its host, by the receiver. On the other hand, when the receiver detects a block having at least one packet received with an error or having at least one packet not received, called herein an "errored" block, then the errored block as well as each subsequently received blocks is stored in the receiver buffer, even if the subsequently received blocks are without error, until an error correcting retransmission of the errored block is correctly received at the receiver. The error correcting retransmission of the errored block could simply be a retransmission of the initial block by the transmitter. The term errored block is used in light of the fact that the block has at least one packet either in error or missing because the packet was dropped in the network. The packets received in the errored block are stored in the receiver buffer as parts of the errored block, and the corresponding entry for the block in the RSM bit map is set to a logical zero.

As to the size of the receiver buffer, several factors need to be considered. For example, the receiver buffer would typically be of sufficient size so as to store all blocks of packets that the transmitter could send during one round trip delay. The reason for that buffer size is that the typical value of the window is the bandwidth delay product. To help understand, consider that there could be information in the network at any instant of time. For example, during the time interval that it takes for a receiver control packet to be transmitted from the receiver to the transmitter on one leg of the full duplex connection, the transmitter would be transmitting blocks of packets to the receiver on the other leg of the full duplex connection. Therefore, the size of the receiver buffer would typically be slightly larger than the priorly defined bandwidth delay product. This guarantees that the receiver buffer will not overflow as long as the window at the transmitter does not exceed the bandwidth delay product.

As to identifying blocks and packets, we can, in the description of an illustrative embodiment of our protocol, use a form of identification called a sequence number. For example, a block of packets will generally include a predefined number of packets. In parallel fashion, but not of immediate interest, it can be noted that a packet will have a fixed number of bits. Usually the predefined number of packets in a block is a power of two, like sixteen packets equals one block. Now moving forward in our description, the block can be identified by a block sequence number. Further, the individual packets can be identified by individual packet sequence numbers. For ease of translation, it is possible to generate the two sets of sequence numbers so that one allows for a mapping to the other. Consider the sequence numbers as being generated in such a manner that the same number is unlikely to be repeated within the time frame reasonably needed to correct errors. For example, let the sequence numbers be a modulo of a fairly large number, like modulo $2^{32}$. Assuming that coding convention, the sequence number of a packet can be a 31-bit number. Assuming, 16 packets in a block, the sequence number of the block can be the 27 most significant bits of the 16 packet sequence numbers that identify the 16 packets in the block, i.e. within the block, the lowest four bits of the packet sequence numbers are dropped to form the sequence number for the block. Thus for convenience, the sequence number of a block will be assumed to be a 27-bit number while the sequence numbers for the 16 packets in the block would be formed by appending 4-bits to the low order bits of the block number. In that way, both blocks and packets have identification numbers, called respectively block sequence numbers and packet sequence numbers.

With that background, $LW_r$ in FIG. 1 is the largest sequence number of a block of packets that has been correctly received and which block is characterized by the fact that all blocks having lower sequence numbers were also correctly received.

The next field in FIG. 1 is a Receiver Status Map (RSM) field. It provides error control information from the receiver to the transmitter whereby the receiver "tells" the transmitter, and the transmitter "knows", whether blocks received at the receiver were received correctly or not correctly. More specifically, the RSM field can be encoded as a bit map, with each of L-bits representing the reception status of a corresponding one of L blocks of packets. For example, the first bit in the RSM field indicates whether the block identified by a block sequence number formed as the sum $LW_r+1$ was received correctly in which case the first bit in the RSM field would have been set to a logical one at the receiver or was not received correctly in which case the first bit in the RSM field would have been set to a logical zero at the receiver. As an aside, note that, from the definition of $LW_r$, the first bit in the RSM field will always be a logical zero, i.e., the block identified by block sequence number $LW_r+1$ is always an errored block. Continuing, the second bit in the RSM field indicates whether the block having the sequence number $LW_r+2$ was received correctly in which case the receiver would have set the bit to a one, or was not received correctly in which case the receiver would have set the bit to zero, etc. for the status of each of the L blocks encoded in the RSM field. As indicated above, a block is said to have been received incorrectly when at least one packet in the block was not received correctly.

The next field in the control packet shown in FIG. 1 is a buffer available field. Through this field, the receiver informs the transmitter of the amount of storage space available in the receiver buffer. The buffer available field, which could be measured in units of blocks, is used by the transmitter to control the number of blocks transmitted or retransmitted to the receiver, so that the receiver buffer does not overflow.

The last field in FIG. 1 is an error-check field. This field contains an error checking code that permits the transmitter to determine whether or not the receiver control packet was received correctly. This field could contain a standard cyclic redundancy code.

FIG. 2 depicts an illustrative transmitter control packet that flows from the transmitter to the receiver.

The first field in FIG. 2 is a LCI field. This field may, but need not, differ from the LCI field of the receiver control packet of FIG. 1 in that the LCI field of the transmitter control packet would include a bit that identifies whether the transmitted packet is a data packet or a control packet. Of course, the additional bit can be included in the LCI field of the receiver control packet of FIG. 1 to make the two LCI fields identical in format.

The second field in FIG. 2 is a k field, and it has the same definition as the k field in FIG. 1 except that it relates to a transmitter rather than a receiver.

The third field in FIG. 2 is an $UW_t$ field. It carries the block sequence number of the last data block transmitted by the transmitter immediately prior to the transmission of the transmitter control packet.

The penultimate field in FIG. 2 identifies the number of packets, $Q_t$, queued for transmission at the transmitter.

The last field in FIG. 2, as in FIG. 1, is an error check field which permits the receiver to verify that the transmitter control packet was received or was not received correctly. This field could contain a standard cyclic redundancy code.

FIG. 3 illustrates a flow chart diagram of a transmitter process, which determines whether there is any block that needs transmission or retransmission. Step 10 determines the mode of operation. When the mode is equal to 2, indicating that error control is in effect, control passes to step 20 which determines whether the RSM field in the receiver control packet reveals a need to retransmit a block. If a block is to be retransmitted, control passes to step 30 which retransmits the block to the receiver. When either the mode is not equal to 2, indicating that error control is not in effect, or the RSM field does not reveal a need to retransmit a block, control passes to step 40. At step 40, the mode is again queried. When the mode is not equal to 0, indicating that there is flow control, control passes to step 400 which is further illustrated in FIG. 4. Step 400 determines whether space is available in the receiver's buffer. When either space is available at the receiver's buffer or when step 40 determines that the mode is equal to 0, indicating that there is no flow control, control passes to step 60 where a new block, if any is ready to be transmitted, is transmitted to the receiver.

We now turn to some further definitions to assist in a further description of an embodiment of the principles of our invention.

Note that $LW_r$ has been defined at the receiver and inserted in a receiver control packet, like in FIG. 1, which is sent from the receiver to the transmitter. Of course, time will elapse, for example, propagation time will elapse before the transmitter receives the receiver control packet. The transmitter, when processing the receiver control packet, is then working with a value of $LW_r$, which because of the elapsed time, may not, in reality, be identical with the then present value of $LW_r$ at the receiver. As an aside, this is still another example of how the transmitter and the receiver can be out of synchronization. Continuing, we then define $LW_t$ to be that value of $LW_r$, which was most recently received by the transmitter.

We can now define the number of blocks, which have been transmitted to the receiver but as to which the transmitter has not yet received a receiver control packet acknowledgment from the receiver indicating that they can be routed to the destination host by the receiver because they and all prior blocks were received correctly by the receiver (called also the number of outstanding blocks in the system and symbolized as OB)as:

$$OB = UW_t - LW_t \leq W \qquad (1)$$

where W is the maximum number of such outstanding blocks that the transmitter is allowed to have in the system, and is also called the flow control window. The transmitter would typically be designed so that the transmitter must stop, or terminate, or interrupt, transmitting if the number of outstanding blocks OB in the system reaches the flow control window W.

The window W is also the transmitter's commitment to the network in the sense that a transmitter, at the time a connection is setup between transmitter and receiver, has typically committed to the network interconnecting the transmitter and the receiver that it, the transmitter, will limit the number of blocks in the network at any time. Although it need not, the window W typically equals the bandwidth delay product, which we defined earlier.

With the window W equal to the bandwidth product and in error free and delay free conditions, acknowledgments are received for blocks just as the window is about to "close". On the one hand, the window is said to be about to close when the number of outstanding blocks OB approaches, but is less than, the flow control window W. This allows transmission of additional blocks without interruption. On the other hand, if the number of outstanding blocks equals the flow control window W, the window is said to be closed and the transmitter would cease transmission, or interrupt transmission, or terminate transmission, of new blocks.

As an aside and as an example of an interruption, assume at least one errored packet was detected at the receiver and the RSM field of the receiver control packet communicated that information to the transmitter. The transmitter then "knows" that there is an errored block and will adapt to retransmit an error correcting version of the errored block, e.g., retransmit the initial block. The transmitter would interrupt, or stop, transmissions of new blocks until the errored block is retransmitted to the receiver and acknowledged as, hopefully, correctly received by the receiver. The retransmission process takes at least one round trip delay, e.g. the time to propagate the retransmitted block from transmitter to receiver plus the time to propagate a receiver control packet from receiver to transmitter, which hopefully will acknowledge that the retransmitted block has been correctly received at the receiver. Clearly, additional round trip delays would be encountered if two or more retransmissions of the block are needed.

As a further aside and in addition to the above delay, recall that it took one round trip delay for the transmitter to conclude that the errored block was received in error by the receiver, i.e. the round trip comprising the initial transmission of the block, which later is found to be an errored block, from the transmitter to the receiver followed thereafter by the transmission from the receiver to the transmitter of the receiver control packet, which includes an RSM field that signals the transmitter that the block was not correctly received at the receiver.

Continuing, when an errored block is detected by the transmitter, the number of outstanding blocks OB can have a maximum value equal to the bandwidth delay product. If the window W is less than or equal to, i.e., does not exceed, the bandwidth delay product, the window closes. The window remains closed during the time period starting with the retransmission of an error correcting retransmission of the errored block and continuing until the transmitter receives a receiver control packet evidencing an acknowledgement from the receiver that the receiver has correctly received the retransmitted block. This time gap is also equal to one round trip delay. No transmission of a new block can occur during this time gap, i.e. only the retransmitted block(s) is (are) sent and no other blocks are sent. In high speed networks, this time gap can be of relatively significant duration resulting in a relatively significant loss in throughput.

The flow control window W can be made larger than the bandwidth delay product to allow continued transmission of blocks during the time gap when the transmitter is waiting for the acknowledgement from the receiver as to the retransmitted block and that increase could result in a reduction in the loss of throughput. On the other hand, when there are delays, an increase in window W would also increase the number of outstanding blocks in the system OB. Since the same window W is typically used to size the network buffers, it is desirable to increase the network buffer size to correspond to the increased window size. However, this can be wasteful of network storage space, since it is not needed to maintain the flow of blocks through the network. As earlier mentioned, the transmitter ordinarily should not keep more data than the bandwidth delay product in the network at any given time. This is typically the commitment to the network. Thus, in the present setup, there is no easy way of increasing the throughput without adversely affecting the commitment to the network.

A problem with the known art is that one window is being used for two purposes: (1) for keeping the commitment to the network so the network will have economically sized buffers and (2) for keeping the receiver buffer from overflowing.

According to the principles of our invention, we use two windows instead of one window and thereby separate the two functions. One window, called the network window, keeps the commitment to the network and the other window, which is called the receiver flow control window and which, typically, will be the larger of the two windows, allows the maximum achievable throughput to be obtained without violating the commitment to the network.

We can do this using the information in the receiver control packet that is sent regularly by the receiver to the transmitter.

For example, referring to FIG. 4, let $N_t$ be the number of blocks correctly received and waiting at the receiver as based on information in a receiver control packet received by the transmitter. A value for $N_t$ can be generated in step 410 by adding up the number of logical ones in the bit map of the RMS field of the receiver control packet illustrated in FIG. 1. Then at step 420 the maximum possible number of unacknowledged blocks in the network NBN equals:

$$NBN = UW_t - LW_t - N_t \qquad (2)$$

Consider then the use of two windows in accord with the principles of our invention. The first window is called a network window and has a size of $W_1$ blocks and the second window is called a receiver flow control window and has a size of $W_2$ blocks. The sizes of the first and second windows can be, but it is not necessary that they be, related such that $W_1$ is less than $W_2$ and such that $W_1$ is approximately equal to the bandwidth delay product and such that $W_2$ is approximately double the bandwidth delay product. Then at steps 430 and 440, the transmitter can keep transmitting when both of the following conditions are met after a new transmission:

$$NBN = UW_t - LW_t - N_t \leq W_1 \qquad (3)$$

$$OB = UW_t - LW_t \leq W_2 \qquad (4)$$

And, in parallel fashion, at steps 430 and 440, the transmitter stops transmitting when either one of the conditions defined by equations (3) and (4) is not met. With such a new arrangement, which is in accord with the principles of our invention, substantial improvement in throughout can be achieved, even in the presence of errors. At the same time, the number of unacknowledged blocks of packets in the network, NBN, will never exceed $W_1$.

Regarding improvement in throughput, assuming a randomly distributed round trip delay RTD with a mean of 60 milliseconds and a standard deviation of 19 milliseconds and assuming a packet size of 4,000 bytes where one byte equals eight bits, and assuming a block size of one packet and assuming a random error bit rate $10^{-7}$ and assuming a comparison between a one window protocol where the window W is the bandwidth delay product versus a two window protocol where $W_1$ is the bandwidth delay product and $W_2$ is equal to 2.5 times $W_1$, studies have shown improvements in throughput:

| Channel Bandwidth | One Window From | Throughput Increase versus | Two Windows To |
|---|---|---|---|
| 100 Mbps | 60–70% | | 96% |
| 200 Mbps | 45–65% | | 95% |
| 500 Mbps | 30–60% | | 94% |
| 1,000 Mbps | 15–60% | | 93% |

This remarkable improvement in throughput directly translates into substantial economies in a system using our two window protocol versus a system using other protocols.

Although our invention has been described and illustrated in detail with respect to a specific end system protocol in a packet transmission system, it is to be understood that the same is not by way of limitation. Rather the spirit and scope of our invention is limited only by the terms of the appended claims.

We claim:

1. A method of communicating packets of information from a transmitter to a receiver in a communications system having a network for interconnecting the transmitter and the receiver, the method including the steps of the transmitter sending packets of data to the receiver in blocks of a preselected number of packets; the receiver regularly sending a receiver control packet to the transmitter, the receiver control packet including information for describing the state of the receiver to the transmitter; and the transmitter regularly sending a transmitter control packet to the receiver, the transmitter control packet including information for describing the state of the transmitter to the receiver, wherein the transmitter sending step further comprises the step of:

sending packets of data as long as the number of unacknowledged blocks in the network does not exceed a first window and as long as the number of outstanding blocks in the system does not exceed a second window.

2. The method defined in claim 1 wherein the transmitter sending step further includes the step of:

interrupting the sending of packets of data when the number of unacknowledged blocks in the network exceeds the first window.

3. The method defined in claim 1 wherein the transmitter sending step further includes the step of:

interrupting the sending of packets of data when the number of outstanding blocks in the system exceeds the second window.

4. The method defined in claim 1 wherein the first window does not exceed the bandwidth delay product of a channel that couples the transmitter and the receiver.

5. The method defined in claim 1 wherein the first window is less than the second window.

6. The method defined in claim 1 wherein the second window is at least twice as large as the first window.

7. The method defined in claim 4 wherein the second window is at least twice as large as the first window.

* * * * *